US012215680B2

(12) United States Patent
Patel et al.

(10) Patent No.: US 12,215,680 B2
(45) Date of Patent: Feb. 4, 2025

(54) PORTABLE, CRYOGENIC FLUID PUMP APPARATUS WITH ASSOCIATED INSTRUMENTATION, CONDUIT LEGS AND ACCESSORIES

(71) Applicants: Bharat Barney Patel, Grand Island, NY (US); Jiyoung Nam, Buffalo, NY (US); Manuel Gonzalez Munoz, Grand Island, NY (US)

(72) Inventors: Bharat Barney Patel, Grand Island, NY (US); Jiyoung Nam, Buffalo, NY (US); Manuel Gonzalez Munoz, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 1242 days.

(21) Appl. No.: 16/715,844

(22) Filed: Dec. 16, 2019

(65) Prior Publication Data

US 2021/0180751 A1 Jun. 17, 2021

(51) Int. Cl.
*F04B 15/08* (2006.01)
*F04B 53/16* (2006.01)

(52) U.S. Cl.
CPC .............. *F04B 15/08* (2013.01); *F04B 53/16* (2013.01); *F04B 2015/081* (2013.01); *F17C 2227/0128* (2013.01)

(58) Field of Classification Search
CPC .... F04B 15/08; F04B 53/16; F04B 2015/081; F04B 2015/0826; F17C 2227/0128
See application file for complete search history.

(56) References Cited

U.S. PATENT DOCUMENTS

| | | | | |
|---|---|---|---|---|
| 3,958,443 | A | 5/1976 | Berrettini | |
| 5,860,798 | A | 1/1999 | Tschopp | |
| 5,934,081 | A * | 8/1999 | Notaro | F17C 5/06 62/50.2 |
| 7,736,132 | B2 | 6/2010 | Bliss et al. | |
| 9,546,645 | B2 * | 1/2017 | Allidieres | F04B 15/08 |
| 9,857,804 | B2 | 1/2018 | Som et al. | |
| 10,054,262 | B2 * | 8/2018 | Baust | F17C 5/02 |
| 2008/0003111 | A1 | 1/2008 | Turan, Jr. | |
| 2011/0056217 | A1 * | 3/2011 | Fennessy | F17C 5/06 62/50.2 |

(Continued)

FOREIGN PATENT DOCUMENTS

| | | |
|---|---|---|
| CN | 205173976 U | 4/2016 |
| CN | 208817083 U | 5/2019 |

(Continued)

*Primary Examiner* — Nathan C Zollinger

(57) ABSTRACT

A portable, cryogenic fluid pump apparatus with associated instrumentation, conduit legs and accessories, are optimally configured on a modular supporting platform for plug and play installation at a filling station and on-site inspection and maintenance at the filling station. Each of the associated instrumentation, conduit legs and accessories are positioned onto a condensed footprint such that access to the platform is possible. The plug and play connection system allows for the rapid connection or disconnection of the various instrumentation, conduit legs and accessories on the modular supporting platform to a vaporizer and a source tank at a filling station. The connections or disconnections may be made safely, quickly and, easily in advance.

26 Claims, 11 Drawing Sheets

(56) References Cited

U.S. PATENT DOCUMENTS

| | | | | |
|---|---|---|---|---|
| 2012/0100018 | A1 | 4/2012 | Rabe | |
| 2013/0213521 | A1* | 8/2013 | Isom | F17C 5/06 141/4 |

FOREIGN PATENT DOCUMENTS

| | | | |
|---|---|---|---|
| CN | 209458655 | U | 10/2019 |
| DE | 909853 | C | 4/1954 |
| KR | 20140098506 | A | 8/2014 |
| WO | 2009061443 | A1 | 5/2009 |
| WO | 2017038673 | A1 | 3/2017 |

* cited by examiner

PORTABLE, CRYOGENIC FLUID PUMP APPARATUS WITH ASSOCIATED INSTRUMENTATION, CONDUIT LEGS AND ACCESSORIES

FIELD OF THE INVENTION

The present invention relates generally to a portable, cryogenic fluid pump apparatus with associated instrumentation, conduit legs and accessories, optimally configured on a modular supporting platform for plug and play installation at a filling station and accessibility to perform on-site inspection and maintenance of the apparatus, associated instrumentation, conduit legs and/or accessories at the filling station.

BACKGROUND OF THE INVENTION

Gas and liquid products, referred to herein and throughout collectively as cryogenic fluid, are used in various commercial and medical applications and are often received, stored, and dispensed through containers of various sizes. There are numerous types of cylinders with each having unique requirements or specifications for holding fluid products such as oxygen, nitrogen, argon, helium, methane, hydrogen, acetylene, natural gas, and mixtures thereof at various pressures and under various conditions.

Containers of such gases and liquids, referred to herein and throughout collectively as cylinders, are typically filled at permanent cylinder filling sites and transported to industrial sites for usage. Once used and emptied, the cylinders are collected and replaced with new cylinders through various transportation/delivery operations. The used or emptied cylinders are returned to a central and permanent filling station for refilling. The filling stations are generally installed, operated, and maintained by industrial gas suppliers who transport filled containers to the point of use. The cryogenic pump, such as a reciprocating sump pump, is utilized as part of the filling station. Generally speaking, at the filling station, cryogenic liquid is fed from a source tank into the cryogenic pump and then pressurized and directed to a vaporizer. Cryogenic vaporized product emerges from the outlet of the vaporizer. The vaporized product subsequently flows into a fill manifold from which the vaporized product is fed into multiple cylinders.

Currently, however, there are significant delays in installation of a cryogenic fluid pump at the filling station. The installation is typically a time-intensive process in which on-site installation of the necessary piping, instrumentation, valving and automation is required to operationally connect the cryogenic fluid pump to an upstream source tank and a downstream vaporizer. The on-site assembly of such components must be procured from different vendors or suppliers, which increases costs, and further increases delays of installation.

As a result, an improved solution for rapid and cost effective installation of a cryogenic pump as part of a filling station is required. Other advantages and applications of the present invention will become apparent to one of ordinary skill in the art.

SUMMARY OF THE INVENTION

The invention may include any of the aspects in various combinations and embodiments to be disclosed herein.

In a first aspect, a portable, cryogenic fluid pump apparatus with associated instrumentation, conduit legs and accessories in an optimal configuration on a modular supporting platform for plug and play installation at a filling station and on-site inspection and maintenance at the filling station, comprising: the modular supporting platform comprising a first supporting structure, a second supporting structure and a third supporting structure to define a footprint of no greater than 16 ft2, said second and third supporting structures substantially perpendicular to the first supporting structure, and further wherein said second and said third supporting structures are situated substantially adjacent to each other; the cryogenic fluid pump apparatus with associated instrumentation, conduit legs and accessories pre-assembled onto the modular supporting platform before deployment to the filling station, wherein the cryogenic fluid pump apparatus with associated instrumentation, conduit legs and accessories are positioned to create the optimal configuration onto the modular supporting platform; said optimal configuration defined, at least in part, by (i) an unobstructed region to access the cryogenic fluid pump apparatus and associated instrumentation, conduit legs and accessories, said unobstructed region comprising a periphery extending along the modular supporting platform to facilitate the plug and play installation at the filling station and the on-site inspection and the maintenance at the filling station, and (ii) substantial horizontal alignment of one or more of the conduit legs with a corresponding downstream and/or upstream components of the filling station; the cryogenic fluid pump apparatus connected to the first supporting structure and the second supporting structure; said conduit legs comprising a suction conduit, a return conduit and a discharge conduit each of which is connected to the cryogenic fluid pump apparatus; said suction conduit extending from a suction port of the pump apparatus and adapted to receive cryogenic fluid from a source tank into the cryogenic fluid pump apparatus, said return conduit extending from a return port of the cryogenic fluid pump apparatus and adapted to return the cryogenic fluid from the cryogenic fluid pump apparatus to the source tank to enable recirculation of the cryogenic fluid from the source tank into the suction conduit, the return conduit followed by re-entry into the source tank, said recirculation occurring until a temperature of the return conduit is sufficiently reduced to prevent vaporization of the cryogenic fluid, said suction conduit and said return conduit extending outwards from the modular supporting platform into the unobstructed region and further wherein said suction conduit is configured to be in substantial horizontal alignment with a suction supply valve of the source tank; said discharge conduit extending from a discharge port of the cryogenic fluid pump apparatus along the unobstructed region and thereafter bent downwards so that a portion of the discharge conduit is situated at a lower elevation than each of the suction conduit and the return conduit, and further wherein said discharge conduit terminates as a branched conduit along the first supporting structure; said associated instrumentation and accessories comprising (i) supply instrumentation and accessories connected to the suction conduit, (ii) return instrumentation and accessories connected to the return conduit and (iii) discharge instrumentation and accessories connected to the discharge conduit; and a controller in electrical communication with one or more components in (i), (ii) or (iii) and the cryogenic fluid pump apparatus to regulate a flow of the cryogenic fluid along the suction conduit, the return conduit and the discharge conduit, said controller located within a control panel connected to the third supporting structure.

In a second aspect, a portable, cryogenic fluid pump apparatus with associated instrumentation, conduit legs and accessories, optimally configured for plug and play installation at a filling station and on-site inspection and maintenance at the filling station, comprising: a modular supporting platform comprising a supporting structure; the cryogenic fluid pump apparatus with associated instrumentation, conduit legs and accessories pre-assembled in close proximity onto the modular supporting platform before deployment at the filling station, wherein the pre-assembled cryogenic fluid pump apparatus with associated instrumentation, conduit legs and accessories are positioned to create an optimal configuration on the modular platform; said optimal configuration defined, at least in part, as an unobstructed region to access the cryogenic fluid pump apparatus and each of the associated instrumentation, conduit legs and accessories, to facilitate the plug and play installation at the filling station and the on-site inspection and the maintenance at the filling station.

In a third aspect, a modular support platform having a first unobstructed region that contains all of the cryogenic fluid pump apparatus components and a second unobstructed region that contains all of the instrumentation and accessories, wherein each of the cryogenic fluid pump components and each of the instrumentation and accessories is pre-assembled before deployment to a filling station into a specific configuration onto the modular support platform to preserve the first unobstructed region and the second unobstructed region to thereby facilitate plug and play installation at a filling station and onsite inspection and maintenance at the filling station, wherein said plug and play installation consists of (i) a first suction conduit connection to a supply valve of a corresponding source tank; (ii) a second return conduit connection to a return valve of the corresponding source tank; (iii) a third discharge conduit connection to an inlet of a vaporizer; and (iv) a fourth cold fill bypass valve connection to an outlet of the vaporizer.

In a fourth aspect, a portable, cryogenic fluid pump apparatus with associated instrumentation, conduit legs and accessories in an optimal configuration on a modular supporting platform for plug and play installation at a filling station and on-site inspection and maintenance at the filling station, comprising: the modular supporting platform comprising a first supporting structure, a second supporting structure and a third supporting structure, said second and third supporting structures substantially perpendicular to the first supporting structure, and further wherein said second and said third supporting structures are situated substantially adjacent to each other; the cryogenic fluid pump apparatus with associated instrumentation, conduit legs and accessories pre-assembled onto the modular supporting platform before deployment to the filling station, wherein the pre-assembled cryogenic fluid pump apparatus with associated instrumentation, conduit legs and accessories are positioned to create the optimal configuration onto the modular supporting platform; said optimal configuration defined by a first unobstructed region to access the cryogenic fluid pump apparatus and a second unobstructed region to access associated instrumentation, conduit legs and accessories, said first unobstructed region non-overlapping with the second unobstructed region; the cryogenic fluid pump apparatus comprising multiple components that are connected to the first supporting structure and the second supporting structure within the first unobstructed region; said conduit legs comprising a suction conduit, a return conduit and a discharge conduit each of which is connected to the cryogenic fluid pump apparatus along the second unobstructed region; said suction conduit and said return conduit extending outwards from the modular supporting platform into the second unobstructed region and further wherein said suction conduit is configured to be in substantial horizontal alignment with a suction supply valve of the source tank; said discharge conduit extending from a discharge port of the cryogenic fluid pump apparatus along the second unobstructed region and extending along a periphery of the second unobstructed region until terminating as a branched conduit along the first supporting structure; said associated instrumentation and accessories comprising (i) supply instrumentation and accessories connected to the suction conduit, (ii) return instrumentation and accessories connected to the return conduit and (iii) discharge instrumentation and accessories connected to the discharge conduit; and a controller in electrical communication with one or more components in (i), (ii) and/or (iii) and the pump apparatus to regulate a flow of the cryogenic fluid along the suction conduit, the return conduit and the discharge conduit, said controller located within a control panel connected to the third supporting structure.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein.

DETAILED DESCRIPTION OF THE INVENTION

Figure 1:
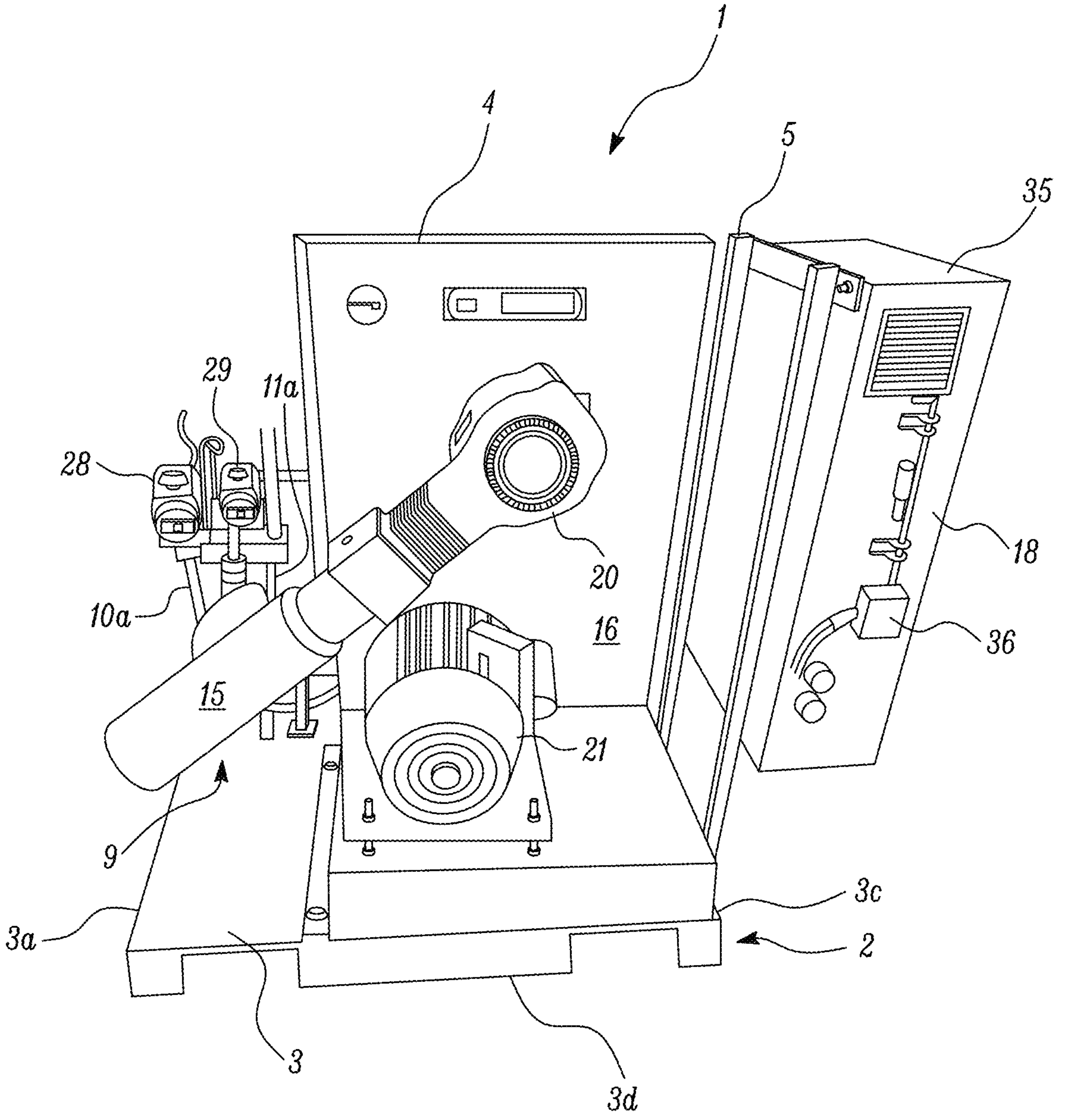
FIG. 1 is a perspective view of the portable, cryogenic fluid pump apparatus with associated instrumentation, conduit legs, and accessories ready for plug and play installation at a filling station.

The objectives and advantages of the invention will be better understood from the following detailed description of the embodiments thereof in connection. The disclosure is set out herein in various embodiments and with reference to various aspects and features of the invention.

The relationship and functioning of the various elements of this invention are better understood by the following detailed description. The detailed description contemplates the features, aspects and embodiments in various permutations and combinations, as being within the scope of the disclosure. The portable, cryogenic fluid pump apparatus and associated instrumentation, conduits and accessories disclosed herein may comprise, consist, or consist essentially of any of such permutations and combinations of the specific parts, components, and structures illustratively described herein. The disclosure further contemplates as restrictively defined a cryogenic fluid pump apparatus and associated instrumentation, conduits and accessories, e.g., wherein one or more of the specifically described parts, components, and structures of the cryogenic fluid pump apparatus and associated instrumentation, conduits and accessories may be specifically omitted, in defining operative embodiments of the present disclosure.

"Cryogenic or cyrogen fluid" and "fluid" as used herein and throughout refers to any phase including, a liquid phase, gaseous phase, vapor phase, supercritical phase, or any combination thereof.

"Conduit" or "conduit flow network", any of which may be used interchangeably herein and throughout, means tube, pipe, hose, manifold and any other suitable structure that is sufficient to create one or more flow paths and/or allow the passage of a cryogen fluid or fluid;

"Components" as used herein and throughout refers to the associated instrumentation, conduit legs and accessories of the cryogenic pump apparatus connected directly or indirectly to the modular support platform and may be used interchangeably with the phrase "associated instrumentation, conduit legs and accessories of the cryogenic pump apparatus".

"Connected" or "operably connected" or "preassembled" or "assembled" or "attachment", any of which may be used interchangeably herein and throughout, means a direct or indirect engagement between two or more components, so as to enable mechanical, chemical, magnetic, electrical or any other known attachment means between the two or more components. Any suitable connection is contemplated, including friction or press fit, adhesion, welding, mechanical fasteners and any other mechanical as well as chemical, magnetic, electrical or other known attachment means for securing two or more components, in which the attachment is permanent or temporary.

"Fill station" or "filling station" or "filling facility" or "fill plant" as used herein and throughout means a central and permanent filling facility that is not mobile for refilling.

In the following description, terms such as horizontal, upright, vertical, above, below, front, behind, beneath and the like, are to be used solely for the purpose of illustrating the present invention and should not be taken as words of limitation.

Prior to emergence of the present invention, installation of a cryogenic pump at a filling station has been a time-intensive process. For example, the required piping to connect the cryogenic pump to the fill station and to connect the associated instrumentation and accessories is typically required to be specially constructed on-site based on the layout of the filling station, which typically contains several confined or obstructed regions. Consequently, the required piping for the cryogenic pump and associated instrumentation and accessories is not necessarily the shortest length, but rather has resulted in a tortuous flow path to circumvent the many confined and obstructed regions in the filling station.

The cryogenic fluid pump itself typically is procured from a particular pump manufacturer while the individual instrumentation and accessories (e.g., valves, pressure gauges, flow meters, controller automation system) for the pump are typically procured from other vendors. The complications involved in such procurement from various vendors typically extends the delay for installation of the cryogenic fluid pump and associated instrumentation, conduit legs and accessories at the fill station.

Even with possession of all components at the filling station, navigating around the premises in a safe manner has been challenging as a result of limited space that can exist between the cryogenic fluid pump, the downstream vaporizer and the upstream source tank.

For all of these reasons, the assembly and installation of the customized piping and corresponding accessories and instrumentation, including valving and control automation systems, to operationally connect the cryogenic fluid pump to an upstream source tank and a downstream vaporizer has been typically a time-intensive and inefficient process. Additionally, access after installation to the assembled pump or associated instrumentations and piping to perform periodic on-site inspection and maintenance has been difficult and potentially creates safety hazards as a result of the confined and obstructed regions surrounding the installed cryogenic pump and associated instrumentation, accessories and piping. Furthermore, oftentimes, one or more components obstructs access to another component, which may be required to perform inspection and maintenance, thereby necessitating removal of multiple components to access the intended component.

To overcome the above-mentioned challenges, the present invention offers a solution which is a notable departure from conventional cryogenic pumps that are installed at a filling station. The inventors have developed a portable, cryogenic fluid pump apparatus with all of the required associated instrumentation, conduit legs and accessories contained on a portable and modular supporting platform that is ready for plug and play installation at a filling station. The apparatus can be transported with all components preassembled onto the platform. Upon arrival at the filling station, the apparatus can be deployed as a single unit that is rapidly connected with minimal connections in a safe manner to the necessary filling station equipment. Installation time is significantly reduced in comparison to conventional cryogenic pump systems at filling stations; and access to the apparatus and its respective components is possible as a result of specially designed unobstructed regions extending along a periphery of the modular supporting platform. The portable, cryogenic fluid pump apparatus and components are configured on the modular platform in such a manner that a user can gain entry to certain portions of the portable, cryogenic fluid pump apparatus with components to (i) facilitate plug and play installation at a filling station, and (ii) perform follow-up onsite inspection and maintenance at the filling station.

FIG. 1 is a perspective view of the portable, cryogenic fluid pump apparatus with associated instrumentation, conduit legs, and accessories 1 ready for plug and play installation at a filling station. A modular supporting platform 2 is provided which includes a bottom plate 3, a frame 5 that is vertically oriented and a panel 4 that is vertically oriented. The cryogenic fluid pump apparatus with associated instrumentation, conduit legs and accessories 1 are pre-assembled onto the modular supporting platform 2 before the on-site plug and play installation at the filling station. The bottom plate 3 preferably has a footprint of no greater than 16 ft2. The bottom plate 3 is bounded by a first side 3*a*, a second side 3*b*, a third side 3*c* and a fourth side 3*d*. The panel 4 and frame 5 are situated substantially adjacent to each other. The panel 4 and frame 5 are preferably oriented perpendicular to the bottom plate 3.

Figure 3:
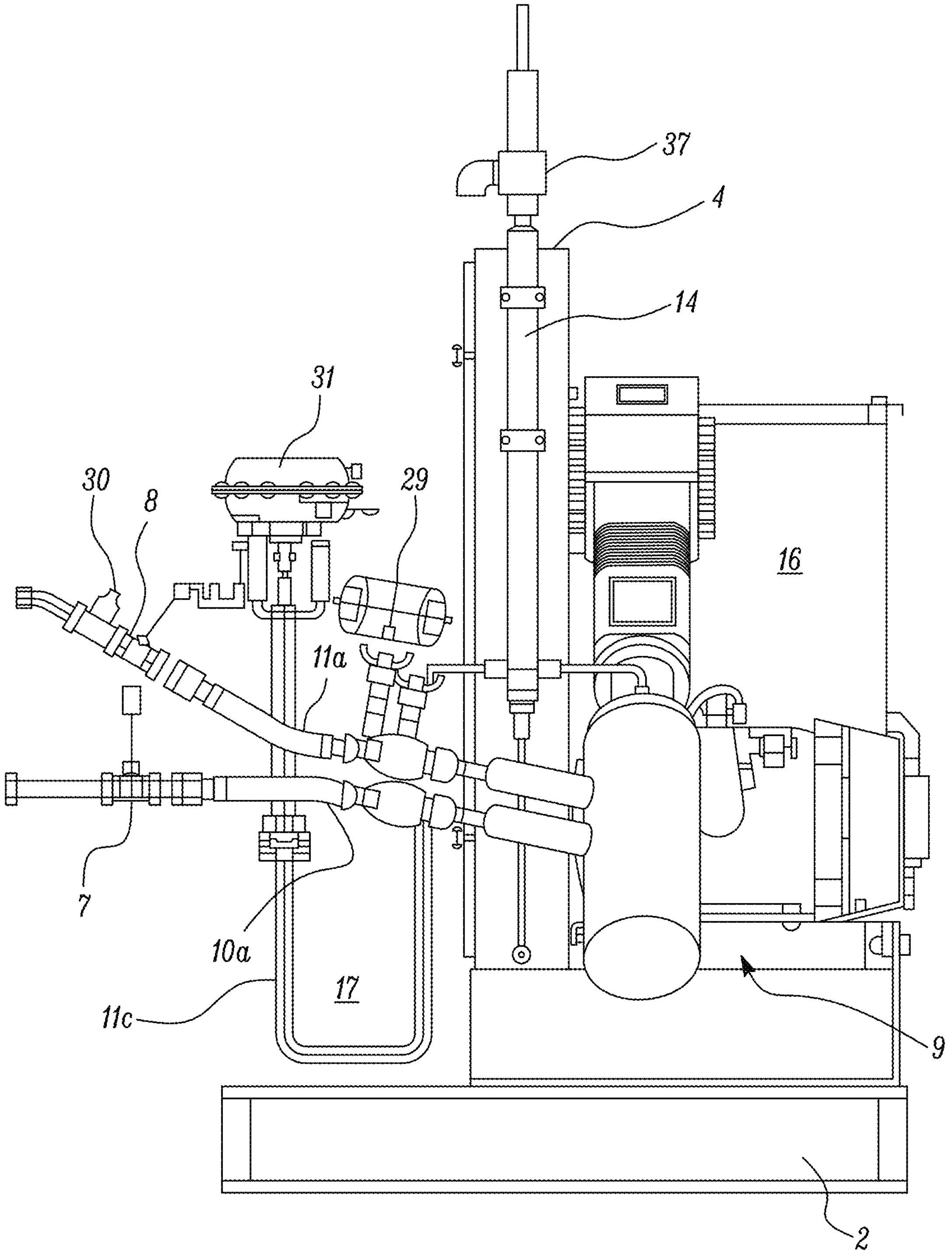
FIG. 3 is a side view of the portable, cryogenic fluid pump apparatus with associated instrumentation, conduit legs, and accessories.
Figure 5:
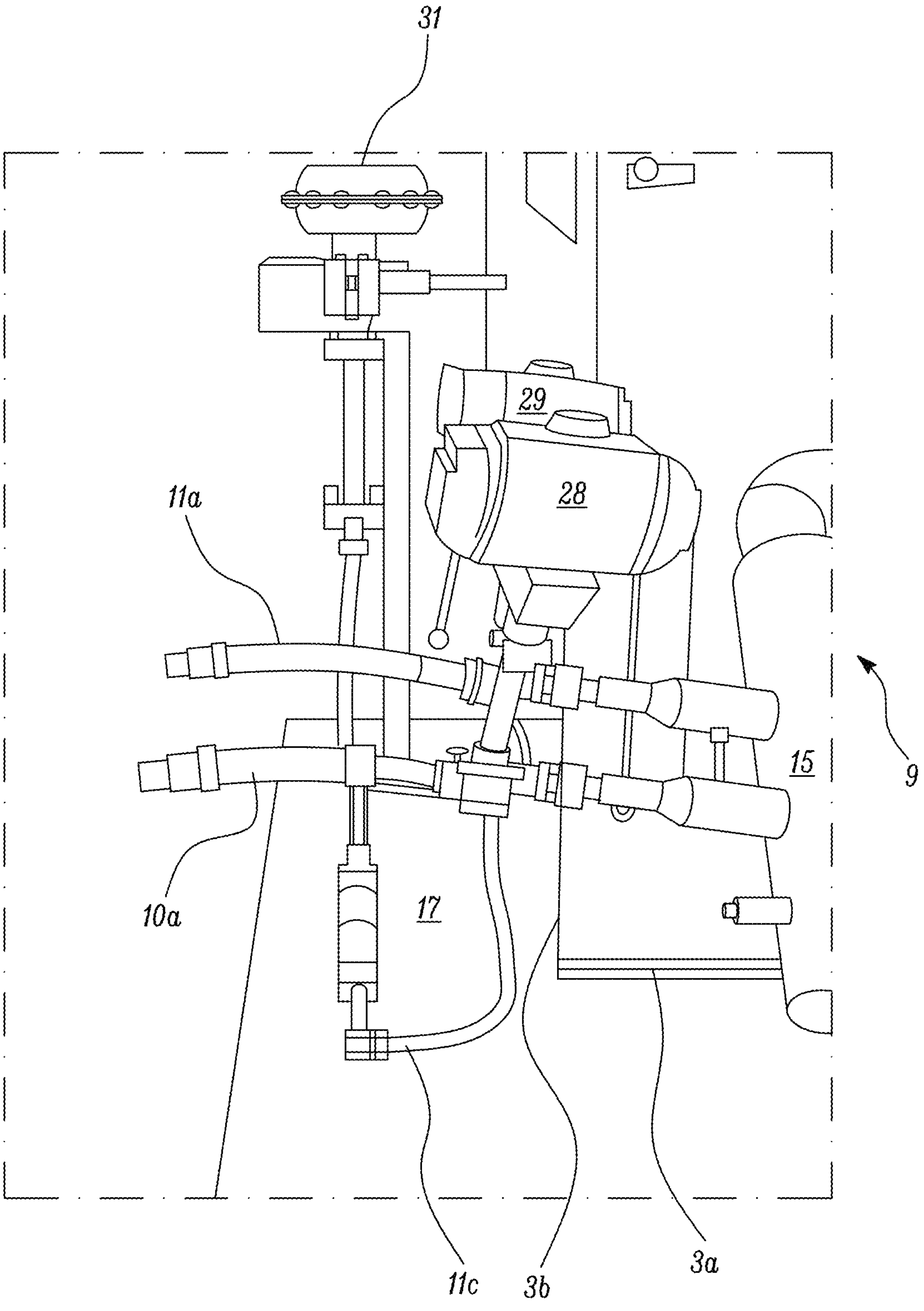
FIG. 5 is a perspective view showing in greater detail the conduit legs connected to the cryogenic fluid pump apparatus along with the corresponding valves.
Figure 7:
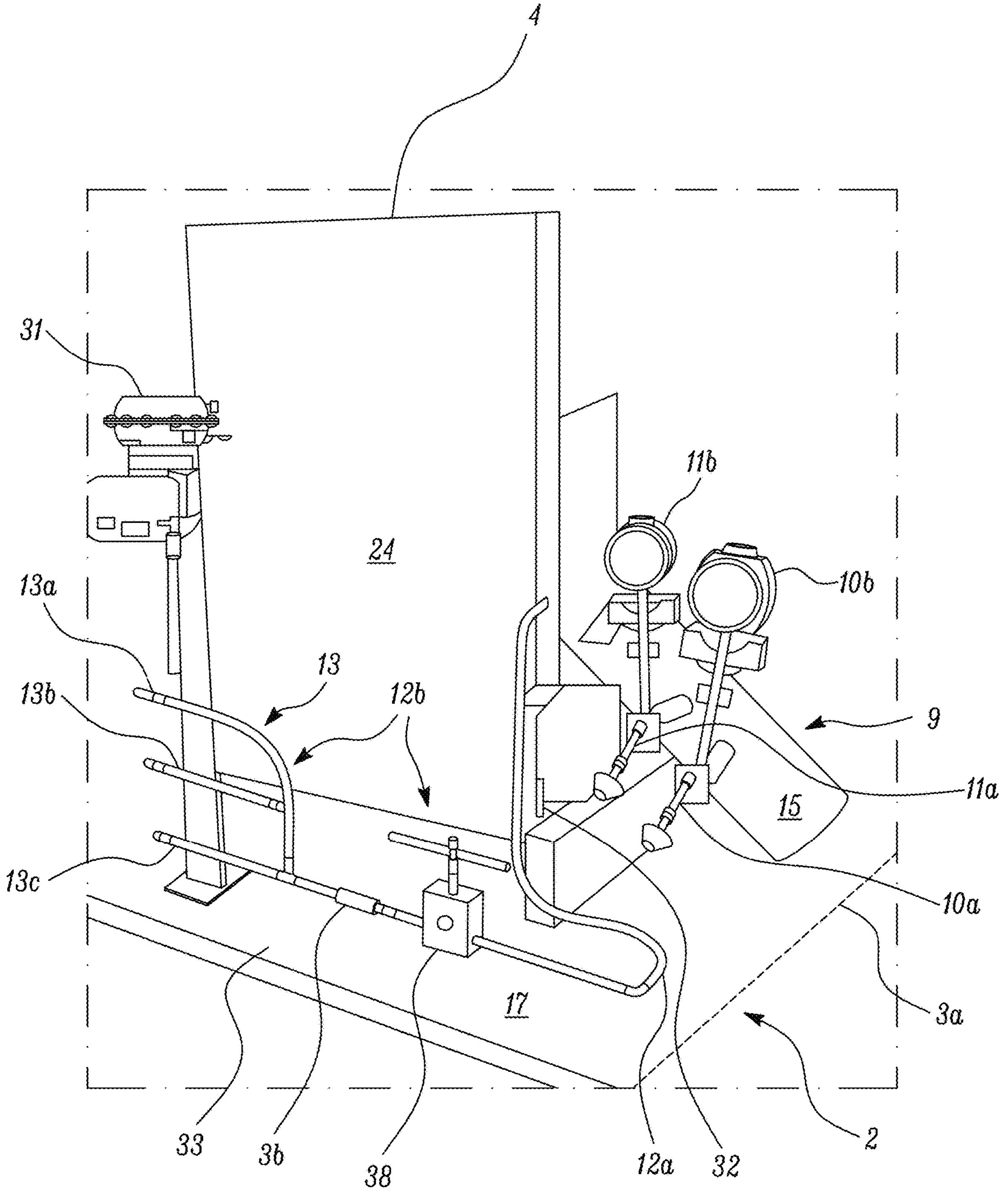
FIG. 7 is a perspective view of the portable, cryogenic fluid pump apparatus with associated instrumentation, conduit legs, and accessories showing in greater detail the vertical platform, cryogenic fluid pump apparatus, discharge conduit and components therealong that terminates as a branched conduit at an edge of the bottom platform.

As can be more clearly seen in FIG. 7, the first side 3*a* of bottom plate 3 is adjacent to the second side 3*b* to at least partially define an unobstructed region 17 that is sufficiently sized to contain the suction conduit 10*a* with supply instrumentation and accessories 10*b*; the return conduit 11*a* with return instrumentation and accessories 11*b*; and the discharge conduit 12*a* with discharge instrumentation and accessories 12*b*. The unobstructed region 17 is a peripheral region along a portion of the side and along the entire rear portion of the modular supporting platform 2 that is accessible to facilitate plug and play installation at a filling station and onsite inspection and maintenance at the filling station. Referring to FIGS. 3 and 5, supply instrumentation and accessories 10*b* includes a suction conduit valve 28 and a first pressure relief valve 7. Return instrumentation and accessories 11*b* includes thermocouple 30, a second pressure relief valve 8 and a return conduit valve 29. Discharge instrumentation and accessories 11*c* includes a pulsation dampener 14, cold fill bypass valve 31, unload valve 32, check flow valve 33 and a branched conduit 13.

Figure 6:
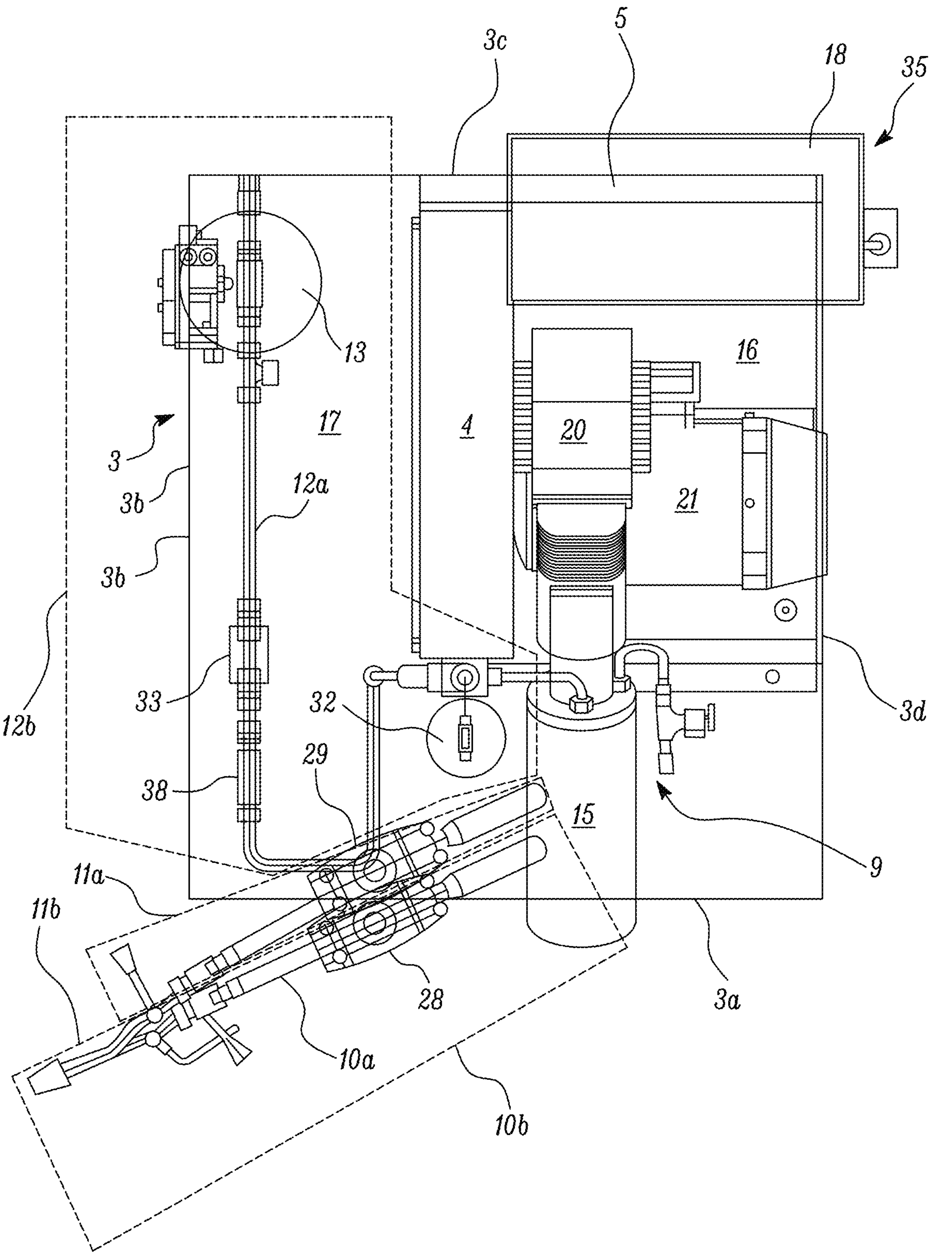
FIG. 6 is a top view of the portable, cryogenic fluid pump apparatus with associated instrumentation, conduit legs, and accessories.

The bottom plate 3 further has a third side 3*c* and a fourth side 3*d* that define at least in part an unobstructed region 16 of modular support platform 2, as can be more clearly seen in FIGS. 1, 3 and 6. Unobstructed region 16 is considered the front portion of the modular supporting platform 2 and allows access to control panel 18 and all pump components of cryogenic fluid pump apparatus 9, which includes sump pump 15, crankshaft 20 and motor 21 (e.g., variable frequency drive).

Unobstructed region 16 is oriented towards the cryogenic fluid pump apparatus 9, which includes sump pump 15, crankshaft 20 and pump motor 21. Unobstructed region 16 is characterized as the front of modular platform apparatus 2 as can be seen in FIG. 1. The panel 4 is oriented vertically and has a removable panel cover 24 to access an interior region (FIG. 9) that is sized to contain a crankshaft belt drive 22 and motor belt drive 23 of the cryogenic fluid pump apparatus 9. The crankshaft belt drive 22 is contained within a top portion of the interior region of the panel 4. An upper rotation ring 25 connects to the crankshaft 20. The motor belt drive 22 is contained within a bottom portion of the interior region of panel 4 that is situated below the crankshaft belt drive 22. A lower rotation ring 26 connects to the motor 21. The corresponding crankshaft 20 is connected to the covering 24 of panel 4, and the motor 21 is connected to bottom plate 3. To enable a compact modular supporting platform 2 of the cryogenic fluid pump apparatus 9 with all corresponding components positioned thereon, the inventors have determined that unobstructed region 16 of panel 4 contains all of the pump components (cryogenic fluid pump apparatus 9 which includes the crankshaft casing 20, sump pump 15 and motor 21) while unobstructed region 17 of the panel 4 contain all of the supply, return and discharge instrumentation and accessories 10*b*, 11*b*, 12*b*, corresponding to the suction conduit 10*a*, return conduit 11*a* and discharge conduit 12*a*.

Sump pump 15 (i.e., the cold end) is solely connected to an end of the crankshaft 20 within unobstructed region 16 along the front of modular supporting platform 2. Sump pump 15 is not directly connected to any portion of modular supporting platform 2. In other words, the sump pump 15 is not directly attached to the bottom plate 3, panel 4 or frame 5. The sump pump 15 is tilted downwards and extends towards an edge of the bottom plate 3. The degree by which the sump pump 15 is tilted downwards can be expressed as an angle that is measured from a vertical that is normal to the bottom plate 3. In one example, the sump pump 15 is tilted to an angle that is less than 60 degrees from the vertical, and more preferably 45 degrees or less from the vertical. The sump pump 15 is designed to remain suspended from the end of the crankshaft 20. The crankshaft 20 is also titled downwards and, preferably, as shown in FIG. 1, the crankshaft 20 is angled downwards to the same degree as the sump pump 15. By having both the sump pump 15 and the crankshaft 20 tilted downwards by a predetermined angle, a net positive suction head can be maintained on sump pump 15, thereby preventing cavitation.

Unobstructed region 17 may be characterized as that portion of the modular platform apparatus 2 located behind panel 4 (i.e., the rear section of the modular supporting platform 2 with the cryogenic fluid pump apparatus 9 and associated instrumentation and accessories and conduit). Unobstructed region 17 is defined by at least a portion of first side 3*a* of bottom plate 3 and second side 3*b* of bottom plate 3. The unobstructed region 17 that is located behind the panel 4 contains sufficient space for supply, return and discharge instrumentation and accessories 10*b*, 11*b*, 12*b*, corresponding to each of the suction conduit 10*a*, return conduit 11*a* and discharge conduit 12*a*, as can be more clearly seen in FIGS. 2, 3, 5, 6, 7 and 8. Configuring suction conduit 10*a* and return conduit 11*a* within the unobstructed region 17 allows for the shortest conduit path to the source tank 19. Unobstructed region 17 is also accessible by a user and contains sufficient space for the suction conduit 10*a*, return conduit 11*a* and discharge conduit 12*a* to extend therealong, as can be more clearly seen in FIG. 5.

Figure 8:
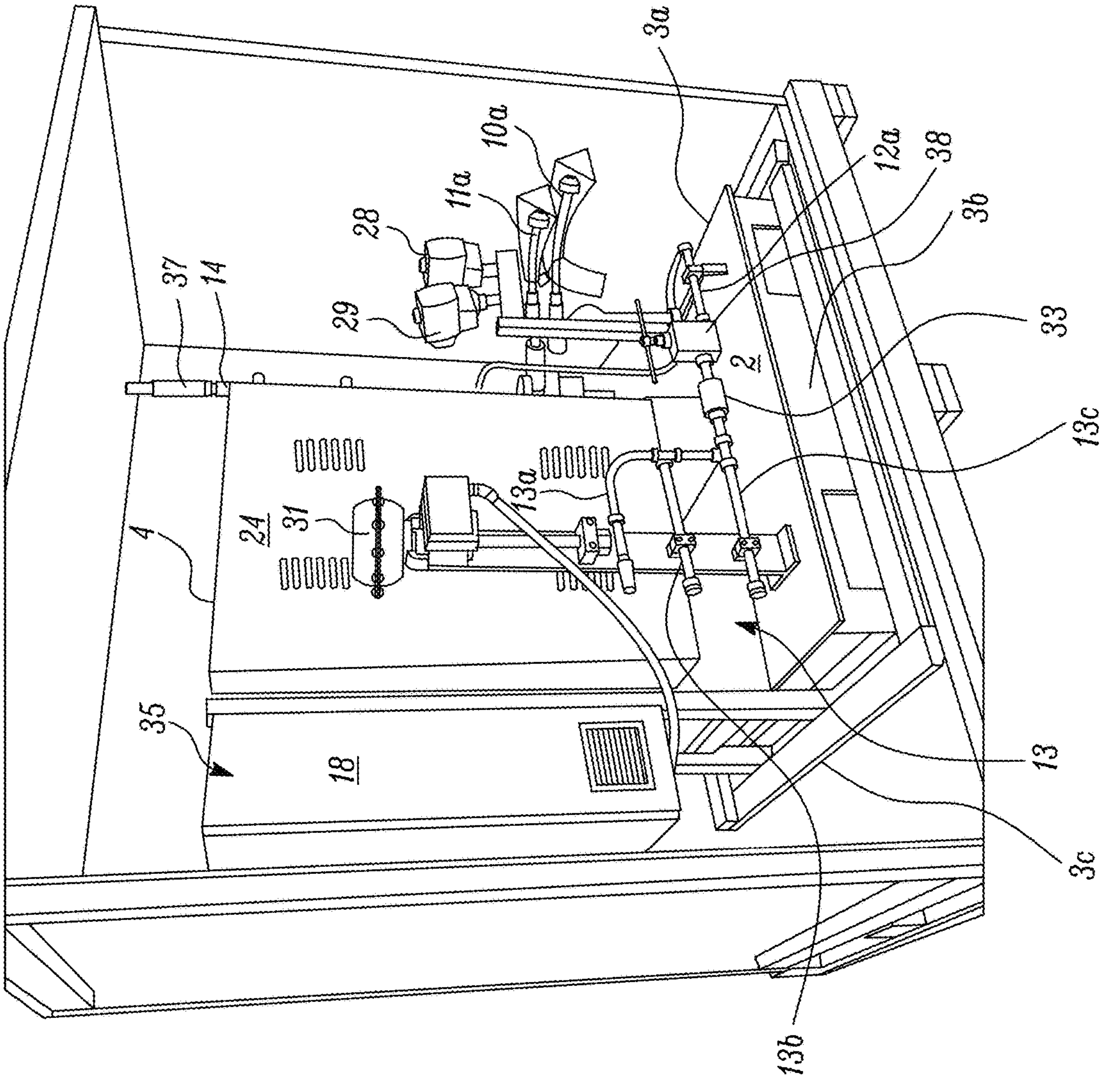
FIG. 8 is another perspective view showing in greater detail components of the portable, cryogenic fluid pump apparatus with associated instrumentation, conduit legs, and accessories along the discharge conduit along a rear view of the modular supporting platform.
Figure 9:
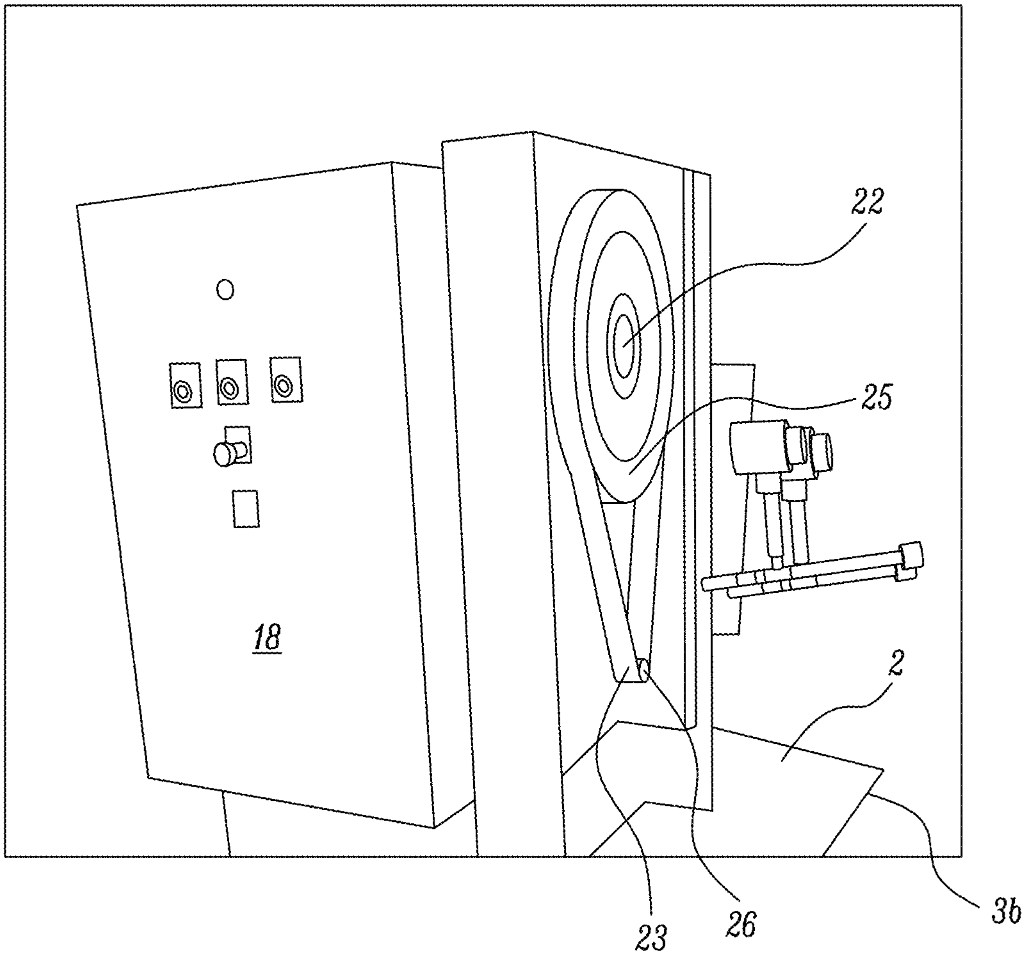
FIG. 9 shows another perspective view of the portable, cryogenic fluid pump apparatus with associated instrumentation, conduit legs, and accessories in which the vertically oriented panel cover has been removed showing the crankshaft belt drive and the motor belt drive.

The frame 5 is connected to the bottom plate 3 and has a geometry that can support a control panel 18 with controller inside control panel (whereby controller inside control panel is collectively referred to herein and throughout by "35" in the Figures). The frame 5 connects to the periphery of bottom plate 3. The frame 5 is perpendicular to the panel 4 and the third side 3*c* of the bottom plate 3 (FIG. 1). Control panel 18 is shown mounted onto frame 5, thereby eliminating a need for a bottom plate or platform therebelow. In this manner, the footprint of modular platform 2 is able to remain compact. The frame 5 is oriented to have a controller in a control panel 35 mounted thereon, as shown in FIGS. 1, 8 and 9. In particular, the controller in the control panel 35 is attached to an external region of the frame 5 to preserve access to unobstructed region 16. In this manner, the controller inside control panel 35 is attached to an exterior of frame 5 so as to not increase the footprint of the modular support platform 2 but yet not create interference with any of the components located in unobstructed region 17 and unobstructed region 16, thereby preserving the ability for a user to access any component as needed during installation and thereafter. It will be appreciated that all components of the cryogenic fluid pump apparatus 9 can be accessed during plug and play connection in a safe and quick manner by a user for installation as well as during routine inspection and maintenance of the cryogenic fluid pump apparatus 9. The controller in the control panel 35 is in electrical communication with supply instrumentation and accessories 10*b* connected to suction conduit 10*a*; return instrumentation and accessories 11*b* connected to return conduit 11*a*; and discharge instrumentation and accessories 12*b* connected to discharge conduit 12*a*. The control panel 35 is vertically oriented and substantially aligned with the frame 5. The control panel 35 has a door that can be opened outwards and away from the modular supporting platform 2, thereby eliminating any interference with unobstructed region 16 or unobstructed region 17.

The ability to utilize a compact modular supporting platform 2 is partially attributed to minimizing the number of components that are directly connected to the platform 2. In this regard, and in accordance with the principles of the present invention, only the controller in control panel 35, motor 21, crankshaft belt drive 22 and motor belt drive 23 are directly connected to the various support structures (e.g., bottom plate 3, side panel 4 and frame 5) of modular support platform 2. It will be appreciated that the present invention is also designed to minimize the number of pump components directly attached to the platform 2, thereby reducing the need for bulker support structures that may require a larger footprint.

Referring to FIGS. 1 and 6, a high pressure switch 36 serves as a safety feature that is connected to the controller in control panel 35. The high pressure switch 36 is wired into the control panel 35. Tubing from the discharge of the sump pump 15 extends to the high pressure switch 36 inside of control panel 35. The tubing is configured so as to not interfere with other components along unobstructed regions 16 and 17. If the pressure that is measured in the discharge conduit 12*a* is determined to be higher than the maximum allowable working pressure of the cylinders 401 (FIG. 4) to be filled with the cryogenic fluid, then the controller inside control panel 35 receives a corresponding signal from the pressure switch 36 and in response thereto will deactivate the cryogenic fluid pump apparatus 9.

As another safety feature built into the cryogenic fluid pump apparatus with components 1 on modular supporting platform 2, a pressure safety valve 37 is connected to the top of pulsation dampener 14, as shown in FIG. 3. The pressure safety valve 37 prevents the sump pump 15 from exceeding its maximum working pressure. The pressure safety valve 37 is designed to activate by releasing cryogenic fluid 65 into the atmosphere at a certain elevated pressure, thereby protecting the cryogenic fluid pump apparatus 9 from the high pressure condition. Before the pressure safety valve 37 is activated, the controller inside control panel 35 stops the cryogenic fluid pump apparatus 9 to prevent the cylinders 401 (shown in FIG. 4) from inadvertently exceeding its allowable working pressure.

Figure 2:
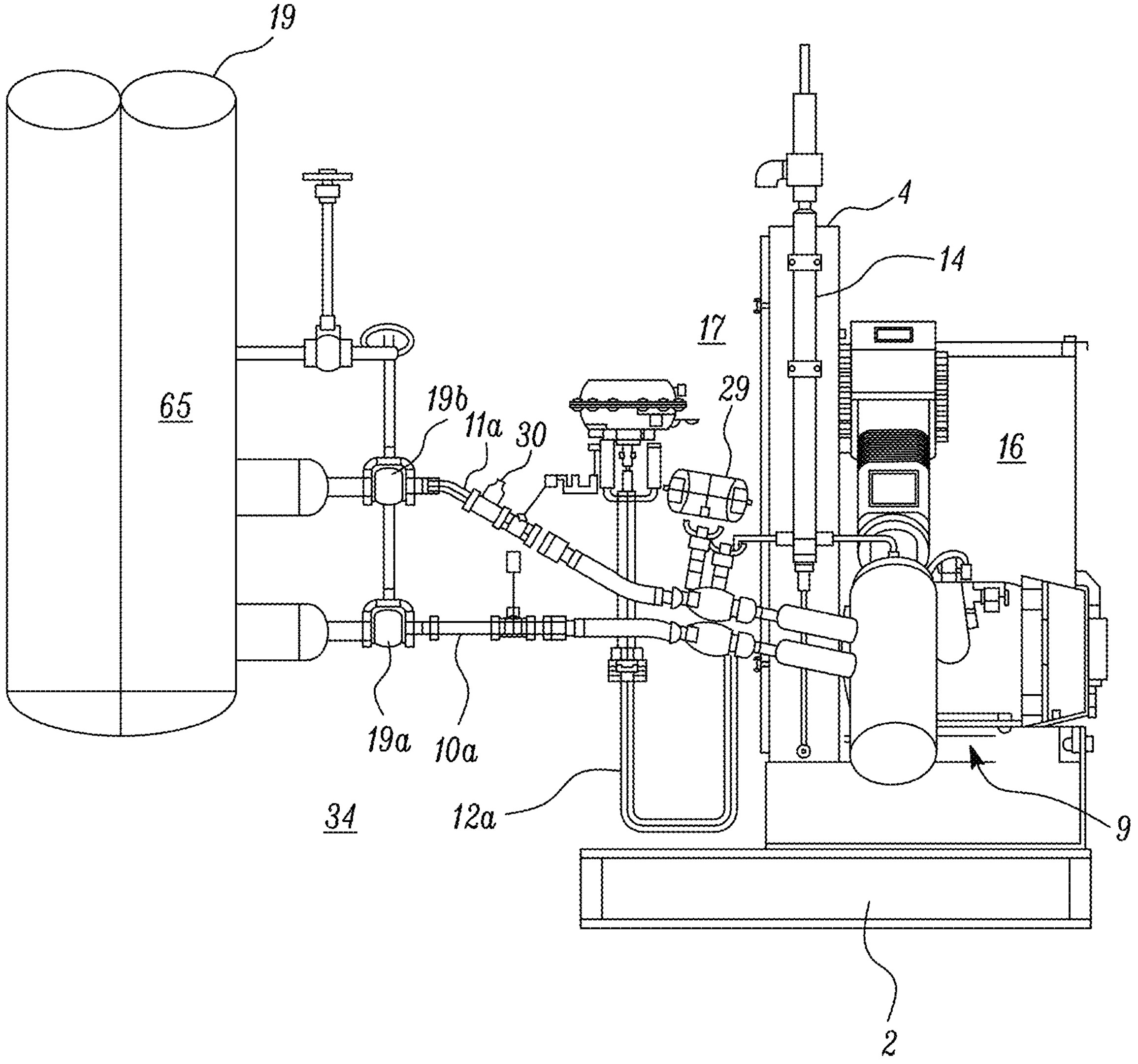
FIG. 2 is a side view of the portable, cryogenic fluid pump apparatus with associated instrumentation, conduit legs, and accessories connected to a source cryogenic fluid tank at a fill station.

Other features of the portable, cryogenic fluid pump apparatus with components 1 further enhance compactness. For example, the suction conduit 10*a* is adapted to be in substantial horizontal alignment with a corresponding supply valve 19*a* of the source tank 19 (FIG. 2). The horizontal alignment minimizes pressure losses, thereby desirably eliminating a need for a higher horsepower pump. The horizontal alignment also allows rapid connect and disconnect of suction conduit 10*a* to the corresponding supply valve 19*a* of source tank 19 (FIG. 2). Generally speaking, the suction conduit 10*a*, return conduit 11*a* and discharge conduit 12*a* are configured along the modular support platform 2 within unobstructed region 17 in the shortest possible manner, thereby minimizing pressure losses and allowing for rapid connect and disconnect for plug and play installation.

The portable, cryogenic fluid pump apparatus with components 1 is optimally positioned so that a relatively large amount of associated instrumentation, conduit legs and accessories can be contained on the modular platform 2 without one component obstructing another component, thereby preserving the unobstructed region 16 and unobstructed region 17. For example, referring to FIGS. 2, 3, 5, 6 and 7, discharge conduit 12*a* extends outwards from discharge port of sump pump 15 in a downward direction towards the unobstructed region 17 of the second side 3*b* of bottom plate 3, and extends therealong until terminating as a branched conduit 13, which a user can readily access without having to remove other components.

Figure 4:
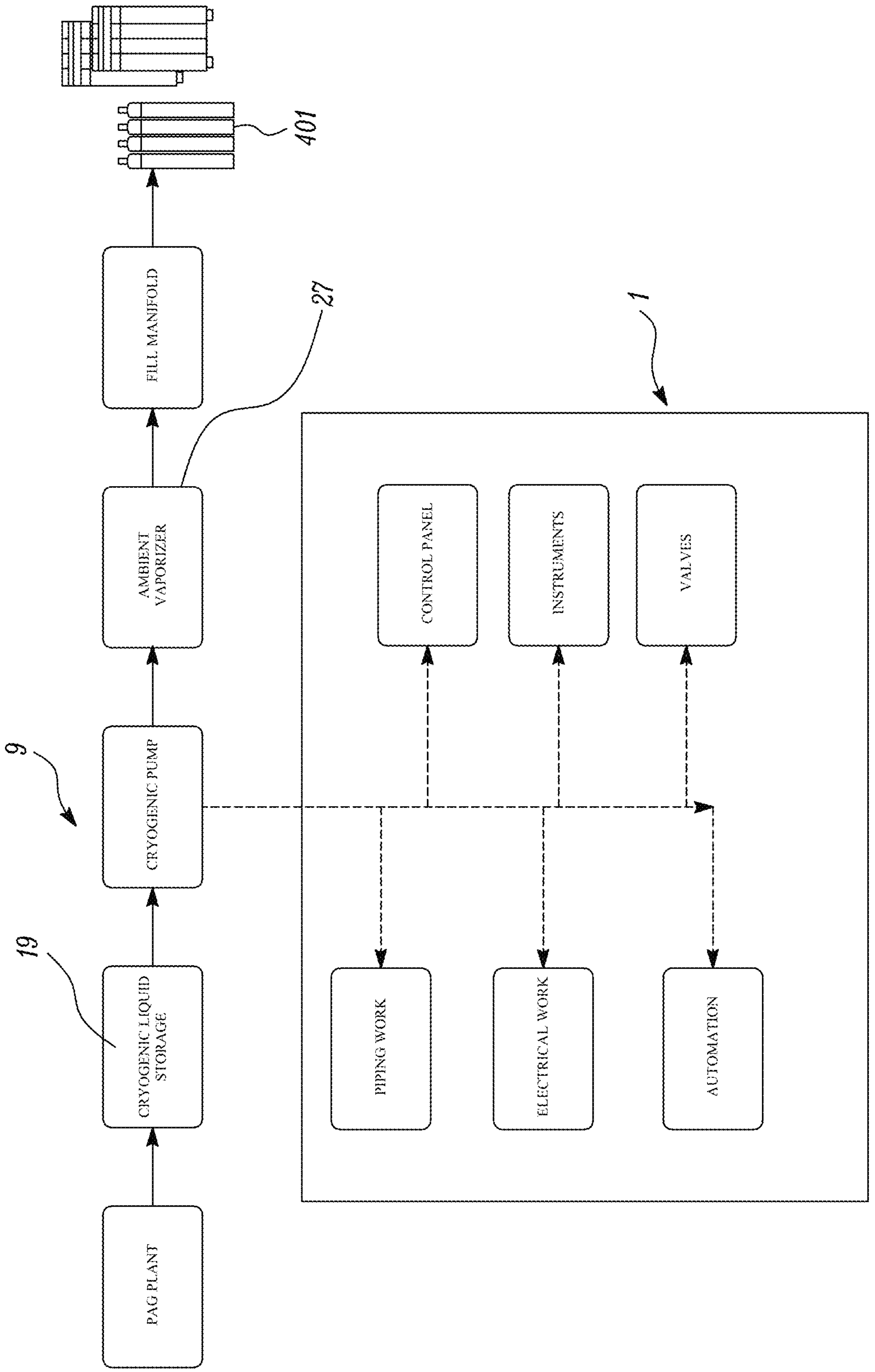
FIG. 4 is a simplified process schematic of the cryogenic fluid pump apparatus with associated instrumentation, conduit legs, and accessories connected downstream to a cryogenic source tank and downstream to an ambient vaporizer as a part of filling station for filling cryogenic fluid into multiple cylinders.

Additionally, it should be noted that the cryogenic fluid pump apparatus with components 1 contains all necessary features that typically have required extensive piping to be created onsite at a fill plant. For example, the cold bypass feature prior to this present invention can typically require extensive piping to be created onsite. Conventional fill plant operation which has utilized a cold fill bypass filling procedure can require extensive piping for connection to a downstream vaporizer 27 (FIG. 4). The extensive piping has typically been constructed onsite. As a result, the cold bypass piping connection to the outlet of the vaporizer can require lengthy duration for installation. However, as will now be described with regards to the present invention, the discharge conduit 12*a* terminates as a branched conduit 13 that is optimally configured and pre-assembled onto the modular support platform 2 to allow plug and play installation to a downstream vaporizer 27. Referring to FIG. 7, the branched conduit 13 includes a top portion 13*a* that is connected to a cold fill bypass valve 31 which directs a certain proportion of the pressurized discharge cryogenic fluid to an outlet of vaporizer 27; and a bottom portion 13*c* that directs a certain proportion of the pressurized discharged cryogenic fluid to an inlet of the vaporizer 27. By having a certain proportion of pressurized cryogenic fluid distributed between a top portion of branched conduit 13*a* and a bottom portion of branched conduit 13*c*, the temperature of the cryogenic gas filled into cylinders 401 (FIG. 4) can be controlled by vaporizing only a proportion of the pressurized cryogenic fluid along discharge conduit 13. In this manner, pressure excursions which may occur when heat of gas compression during filling exceeds heat dissipation rate from cylinder walls is controlled, thereby allowing the vaporized cryogenic fluid to be rapidly filled into cylinders 401 without delays associated with pressure excursions from elevated heat of compression. The process is more fully described in 13277-US (Ser. No. 13/746,020), which is incorporated herein by reference in its entirety for all purposes. Unlike conventional practice, the present invention incorporates the cold fill bypass valve 31 and associated conduit, accessories and instrumentation as part of a filling station operation onto a portable cryogenic fluid pump apparatus with components 1.

Referring to FIG. 7, the branched conduit 13 consists of a top portion 13*a*, middle portion 13*b* and a bottom portion 13*c*. The branched conduit 13 is intentionally positioned along an edge of the second side 3*b* of bottom plate 3 to enable a user to readily access the mobile supporting platform 2 along the unobstructed region 17 in a safe and rapid manner to make the connections as needed during installation and disconnections during periodic inspection and maintenance.

The discharge conduit 3 is intentionally designed to extend as low as possible to the bottom plate 3 along the rear portion of unobstructed region 17 of the modular platform 2 to allow a user to gain entry onto the rear of the modular platform 2 and access various components, including removal of panel cover 24 to inspect belt drive 22 and the motor belt drive 23 (belt drives 22 and 23 shown in FIG. 9). Additionally, FIG. 7 shows that the return conduit 11*a* and suction conduit 10*a* are configured as close as possible to the first side 3*a* of bottom plate 3 (FIG. 7), thereby allowing a user to access and remove covering 24 from panel 4 without the suction conduit 10*a* and return conduit 10*a* creating undesirable interference and obstruction.

As part of the discharge conduit 12*a*, various discharge instrumentation and accessories 12*b* are connected to and preferably in alignment with discharge conduit 12*a*. Each of the components is optimally configured to minimize the footprint of the modular support platform 2 and preserve access to components along unobstructed region 17 as well as cryogenic fluid pump apparatus 9 along unobstructed region 16 and controller inside control panel 35 mounted onto frame 5. For example, a pulsation dampener 14 (FIG. 2) and unload valve 32 (FIG. 7) are connected along the discharge conduit 12*a*. The dampener 14 is preferably a pipe that is located upright and in contact with the panel 4. The dampener 14 acts as a buffer to assist in reduction of vibration during operation of the cryogenic fluid pump apparatus 9. The unload valve 32 is strategically located in-line with the bent portion of the discharge conduit 12*a* (FIG. 7) and is designed to be activated into the open position to remove any load on the cryogenic fluid pump apparatus 9 prior to activating the cryogenic fluid pump apparatus 9, thereby preventing a surge in current when the cryogenic fluid pump apparatus 9 is ready to be activated. The unload valve 32 is connected to the bottom portion of pulsation dampener 14 along discharge conduit 12*a* in a manner that does not interfere with unobstructed region 17. Without the unload valve 32, the motor 21 may incur unacceptably high current load as a result of a pressure surge or rise in the discharge conduit 12*a* at startup of the motor 21. Accordingly, a relatively small tubing (FIG. 7) is connected to the bottom of the pulsation dampener 14 so that setting the unload valve 32 into the open position prior to activating the pump motor 21 of the cryogenic fluid pump apparatus 9 can allow cryogenic fluid 65 (which can be in gas or liquid phase) to vent, so as to relieve the pressure surge in the discharge conduit 12*a,* and thereby reduce the current load to acceptable levels that does not damage the pump motor 21 of the cryogenic fluid pump apparatus 9.

Still further, additional discharge instrumentation and accessories 12*b* include an isolation valve 38 as can be seen in FIGS. 6 and 7. The isolation valve 38 may be a manually operated valve that is designed to isolate the cryogenic fluid pump apparatus 9 if inspection and maintenance work must be performed on any components of the cryogenic fluid pump apparatus 9. The isolation valve 38 is connected to and preferably in alignment with discharge conduit 12*a*. FIGS. 6 and 7 show that the isolation valve 38 is situated along the portion of the discharge conduit 12*a* that has been bent downwards towards bottom plate 3 along second side 3*b* of bottom plate 3. The isolation valve 38 as configured does not interfere with any components situated along unobstructed region 17 such that access to any portion thereof remains possible during plug and play installation, inspection or periodic onsite inspection and maintenance or service.

Check valve 33 is another component of discharge instrumentation and accessories 12*b*. Check valve 33 is located downstream of the isolation valve 38 and upstream of branched conduit 13. Similar to the other discharge instrumentation and accessories 12*b*, check valve 33 is connected to and in alignment with discharge conduit 12*a*. Check valve 33 prevents backflow of cryogenic fluid 65 from the discharge conduit 12*a* as a result of any pressure difference which may occur during the filling operation.

Figure 11:
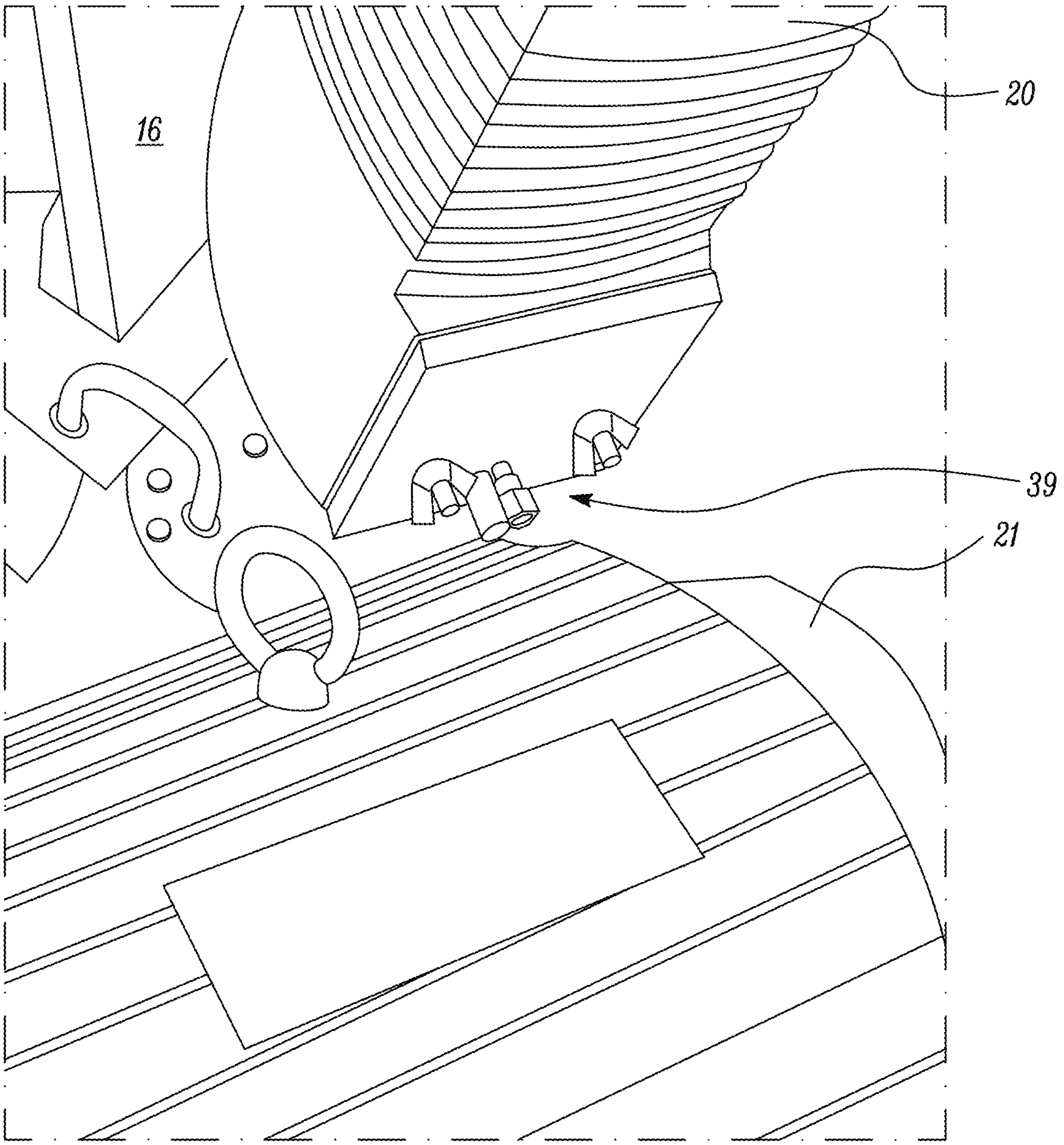
FIG. 11 shows a nitrogen purge connection along the cryogenic fluid pump apparatus.

A nitrogen purge connection 39 in FIG. 11 is also included as part of the present invention in one aspect. The nitrogen purge connection 39 is separate and distinct from the supply instrumentation and accessories 10*b* (connected to suction conduit 10*a*); return instrumentation and accessories 11*b* (connected to return conduit 11*a*); and discharge instrumentation and accessories 12*b* (connected to discharge conduit 12*a*). The nitrogen purge connection 39 is connected to the crankcase of crankshaft 20 along unobstructed region 16. During a filling operation at a filling station in which the cryogenic fluid pump apparatus 9 is pressurizing cryogenic fluid 65 from the source tank 19, the nitrogen purge is continuously running whereby nitrogen gas is flowing pass the seal area of the piston region (i.e., the inner region between the crankshaft 20 and sump pump 15) to prevent potential moisture buildup and subsequent ice formation in the event that cryogenic fluid 65 were to leak from the piston region into the surrounding environment of the cryogenic fluid pump apparatus 9. The cryogenic fluid pump apparatus with components 1 is designed to only operate when nitrogen flow is detected to be flowing across the seal of piston of the cryogenic pump apparatus 9. The piston is connected to crankshaft 20 and extends to the sump pump 15. The flow of nitrogen is monitored with a flow switch located inside the controller of control panel 35. If the nitrogen purge across the seal region of piston is not occurring, the controller inside control panel 35 will transmit an output signal to deactivate the cryogenic fluid pump apparatus 9 (even if there is no leak) as another safety precaution that is incorporated when operating the present invention.

Figure 10:
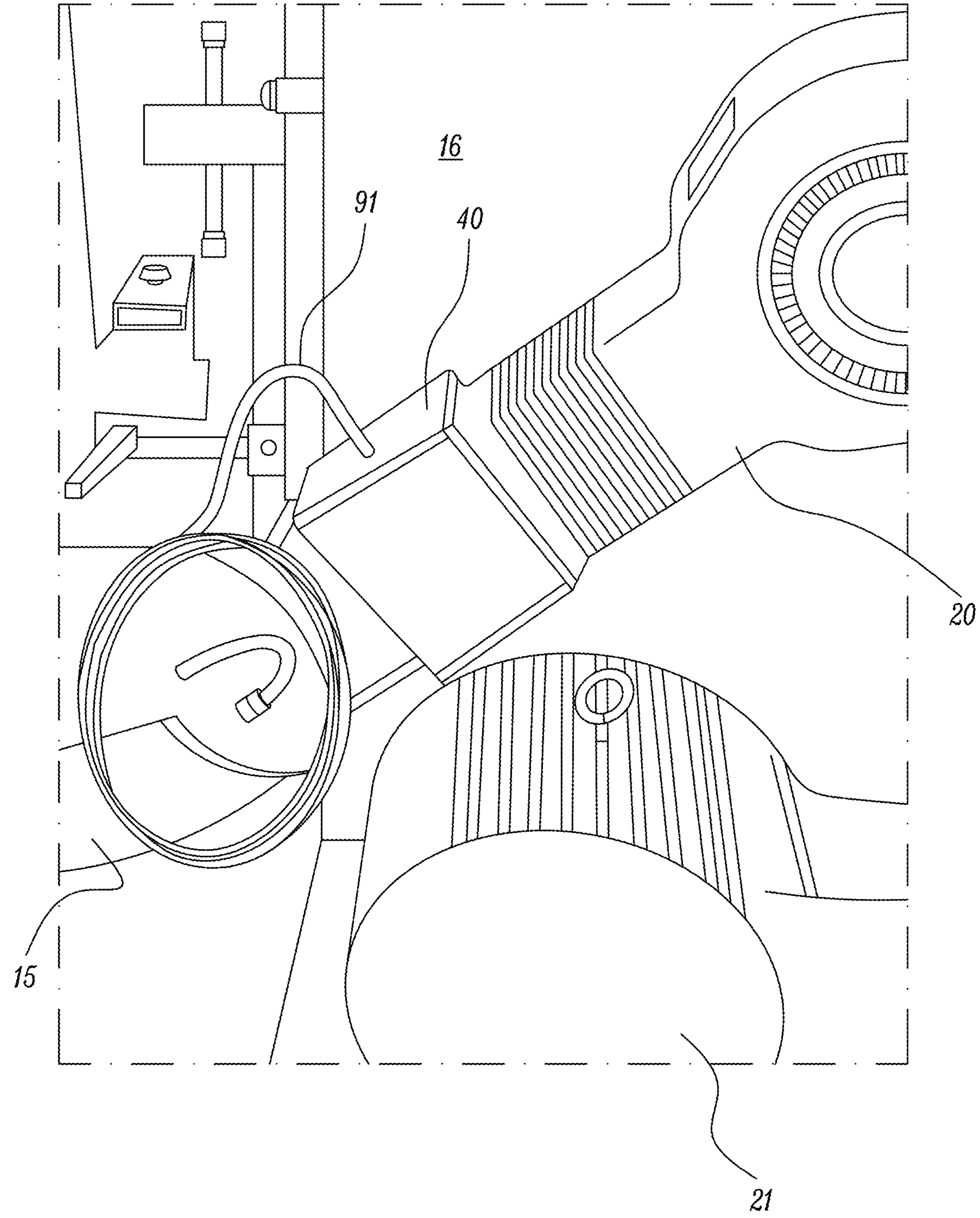
FIG. 10 shows the crankshaft with a thermocouple that is used to detect a seal leak.

Referring to FIG. 10, a thermocouple connection 40 is shown between the sump pump 15 (cold end) and the crankshaft 20 (warm end) of cryogenic fluid pump apparatus 9. Thermocouple 41 (FIG. 10) inside thermocouple connection 40 measures the temperature of the region between the sump pump 15 (cold end) and the crankshaft 20 (warm end) to determine if there is a leak as a result of a measured temperature that could indicate a leak is imminent or has occurred. As mentioned hereinabove, the nitrogen purge is always running and is intended to act as a backup safety remedy if the temperature detection of seal is not working or has failed to detect a temperature that could indicate a leak is imminent or has occurred.

The suction conduit 10*a* and return conduit 11*a* are positioned at a higher elevation than the discharge conduit 12*a* to avoid interference of the various conduits and other components. However, the suction conduit 10*a* is not positioned so high as to eliminate the substantially horizontal alignment with the corresponding supply valve 19*a* of upstream source tank 19 (FIG. 2). As such, the placement of the suction conduit 10*a* is a critical design consideration and beneficially reduces pressure losses and facilities plug and play installation. On the contrary, conventional onsite practice has typically required elbows and fittings as the way to establish connection between the source tank 19 and cryogenic fluid pump apparatus 9, which undesirably leads to substantial pressure losses.

FIG. 2 shows that the return conduit 11*a* is at a relatively higher elevation than the discharge conduit 12*a*, but may not be horizontally aligned to the degree of the suction conduit 10, as can be more clearly seen in FIGS. 2 and 3. Although, the return conduit 12*a* is shown slightly angled upwards from the return port of the sump pump 15 of the cryogenic fluid pump apparatus 9 to connect to a corresponding return valve 19*b* of the source tank 19, the degree of elevation is minimal and the length of return conduit 12*a* as well as the suction conduit 10*a* remains substantially short in length to enable rapid connect and disconnect at a filling station or plant so that challenges in navigating around confined and obstructed regions in the filling station can be avoided.

The return conduit 11*a* is used in conjunction with the suction conduit 10*a* in a recirculation process that occurs prior to pumping cryogenic fluid through pump apparatus 9. In particular, referring to FIG. 2, prior to activating cryogenic fluid pump apparatus 9, cryogenic fluid 65 in a liquid phase is introduced from source tank 19, through supply valve 19*a* set in an open position, to enter suction conduit 10*a*, where the fluid flows through suction conduit valve 28 in an open position and then is fed back along return conduit 11*a*, through return conduit valve 29 in the open position and then reintroduced into the source tank 19. At start-up, atmospheric heat from the surrounding environment 34 has a tendency to vaporize the cryogenic liquid 65 along suction conduit 10*a* and/or return conduit 11*a*. As a result, the recirculation loop from source tank 19, suction conduit 10*a*, return conduit 12*a* followed by reintroduction into source tank 19 continues until a temperature measurement by a thermocouple 30 situated along the return conduit 11*a* determines that the temperature of the cryogenic fluid 65 is sufficiently reduced to prevent vaporization of cryogenic fluid 65, at which point the cryogenic fluid 65 in a liquid phase can be introduced into the sump pump 15 without cavitation.

When the temperature of the cryogenic fluid 65 as measured in the return conduit 11*a* has reached a sufficiently low temperature, the return conduit valve 29 is set from the open position to a closed position. The cryogenic fluid 65 is withdrawn from source tank 19, and then flows along suction conduit 10*a*, suction conduit valve 28, which remains in the open position, and then the fluid 65 enters the piston assembly cold section of cryogenic apparatus 9 (i.e., sump pump 15). The fluid 65 is pressurized and flows into the warm section of cryogenic apparatus 9 (i.e., crankshaft 20), and then the fluid 65 in a pressurized state exits into discharge conduit 12*a*, which is located along unobstructed region 17. The pressurized cryogenic fluid 65 flows therealong until reaching a branched conduit 13, located along edge of second side 3*b* of bottom plate 3 (as can be more clearly seen in FIG. 7). A first portion of the pressurized fluid 65 flows into top portion of branched conduit 13*a*, through cold bypass valve 31, which is set into the open position, thereby allowing the first portion of the pressurized fluid 65 to bypass the inlet of vaporizer 27 and substantially remain in the liquid phase. The remainder or second portion of the pressurized fluid 65 flows into the bottom portion of branched conduit 13*c* which is connected to an inlet of vaporizer 27. The second portion of fluid 65 emerges from the vaporizer 27 in a vapor phase to produce elevated pressure gas. The elevated pressure gas mixes with the first portion of the unvaporized cryogenic fluid 65. Heat from the elevated pressure gas vaporizes the first portion of the pressurized cryogenic fluid 65 in the liquid phase by direct heat exchange, thus producing a controlled temperature of elevated pressure gas which is provided at the optimal and desired temperature for rapidly filling the cylinders 401 through fill manifold (FIG. 4). The temperature of the controlled temperature elevated pressure gas is maintained within the desired range using temperature control system (e.g., controller inside control panel 35) by manipulating bypass valve 31 to be in a more open or more closed position during the filling, thus varying the first portion of pressurized cryogenic liquid 65 that is required to mix with the elevated pressure gas 65. The controlled temperature elevated pressure gas is then filled into the cylinders 401 through fill manifold (FIG. 4). A combination of the liquid bypass valve 31, cryogenic liquid pump apparatus 9 (i.e., sump pump 15, crankshaft 20 and a motor 21, which is preferably a variable frequency drive (VFD)), gas temperature sensing means (not shown), all of which are coordinated under a dedicated control scheme preferably using controller inside control panel 35, is used to create temperature control during filling. The VFD and valves can be controlled by an automated control system such as controller inside control panel 35 based on a predetermined algorithm such as a fuzzy logic algorithm.

The structural attributes of the present invention offer rapid plug and play connection for installation, inspection and maintenance not possible in the prior art. It will be appreciated by one of ordinary skill in the art that conventional practice has been for the associated supply, return and discharge instrumentation, conduit legs and accessories 10*b*, 11*b* and 12*b*, respectively, to be disseminated across large areas of the filling facility, whereby rapid connect and disconnect for installation, inspection and periodic on-site inspection and maintenance can take, on average, several days to complete. In contrast, the present invention offers plug and play of the cryogenic fluid pump apparatus with associated instrumentation, conduit legs, and accessories 1 to required equipment in the filling station within a few hours. The connections or disconnections may be made safely, quickly and, easily in advance. The optimal configuration of each of the components ensures performance and safety is maintained along with ease of inspection and maintenance.

FIG. 4 provides a comparison of the installation procedure between conventional onsite practice and that of the inventive cryogenic fluid pump apparatus with associated instrumentation, conduit legs, and accessories 1. FIG. 4 shows that conventional procedure requires piping work, electrical work, automation, configuration of a control panel, instrumentation and valves, all of which will require substantial time to construct and assemble based on the filling station layout. In contrast, the present invention eliminates the piping work, electrical work, automation, configuration of a control panel, instrumentation and valves. The present invention merely requires 4 connections during installation, namely connection between the corresponding supply valve 19*a* of source tank 19 and suction conduit 10*a*; connection between the inlet of downstream vaporizer 27 and the bottom portion 13*c* of the branched conduit 13 of discharge conduit 12*a*; connection between cold fill bypass valve 31 and the outlet of downstream vaporizer 27; and connection between the return conduit 11*a* and the corresponding return valve 19*b* on the source tank 19. Each of the suction conduit 10*a* and return conduit 11*a* is preferably a flexible hose that allows flexing to occur as a result of the vibration of the cryogenic fluid pump apparatus 9 during operation. The present invention avoids the difficulties of making connections based on certain components typically widespread across different regions of the filling station by virtue of all required components locally concentrated on the modular support platform 2 and optimally configured thereon.

Because the plug and play connection system allows for the rapid disconnection of the suction conduit 10*a* with source tank supply valve 19*a*; return conduit 11*a* with source tank return valve 19*b*; bottom portion of branched conduit 13*c* with inlet of vaporizer 27; and top portion of branched conduit 13*a* containing the cold fill bypass valve 31 to an outlet of vaporizer 27, any component of the cryogenic fluid pump apparatus with associated instrumentation, conduit legs, and accessories 1, including the cryogenic fluid pump apparatus 9, may be serviced, installed, pulled, or replaced more easily. Once the necessary work has been performed, the plug and play connection system allows for the rapid connection to the filling station equipment faster and more efficiently than a conventional cryogenic pump apparatus with associated instrumentation, conduit legs and accessories that are not pre-configured on the modular supporting platform, but, instead are scattered in a widespread manner along various confined and obstructed regions of the fill plant.

Onsite inspection and maintenance of cryogenic fluid pump apparatus 9 requires removing vertically oriented covering 24 from panel 4 which requires access by a user, and which also requires the ability to have enough clearance to remove the covering 24 from panel 4 without removing other components in close proximity. Referring to FIG. 7, covering 24 can be removed without colliding or damaging with the other components shown on modular support platform 2 as a result of the optimal configuration of each of the components on modular supporting platform 2. FIG. 9 shows the interior of panel 4 after panel 24 is removed for inspection of the crankshaft belt drive 22 and motor belt drive 23.

Other variations to the embodiments illustrated and described hereinabove are contemplated that are intended to fall within the scope of the present invention. For example, the supporting structures for modular support platform 2 may be modified to a different geometry based on the maintenance of cryogenic fluid pump apparatus 9. In one example, the modular support platform 2 may be designed to define a footprint of greater or less than 16 ft2 without departing from the scope of the present invention.

In another example, the crankshaft 20 and the motor 21 can be configured in a substantially straight line along the bottom plate 3, thereby allowing the side panel 4 to be potentially smaller without an interior region designed to receive corresponding crankshaft belt drive 22 and corresponding motor belt drive 23 and hub rings for each of the crankshaft belt drive 22 and motor belt drive 23. Instead, at least a portion of the bottom plate 3 can be designed to accommodate the hub rings, belt drives 22 and 23, motor 21 and crankshaft 20. Still further, it should be understood that the bottom plate 3 may be replaced with a panel-like structure. Alternatively, or in addition thereto, the frame 5 may be replaced with any other suitable structure capable of supporting controller inside of control panel 35.

Although a reciprocating sump pump 15 is preferably utilized, other pressurizing systems may be employed. The specific type of system may be dependent on several factors, including, by way of example, the layout of the particular fill plant and the amount of pressure losses incurred when cryogenic fluid 65 is directed from the source tank 19 to the vaporizer 27.

While it has been shown and described what is considered to be certain embodiments of the invention, it will, of course, be understood that various modifications and changes in form or detail can readily be made without departing from the spirit and scope of the invention. It is, therefore, intended that this invention is not limited to the exact form and detail herein shown and described, nor to anything less than the whole of the invention herein disclosed and hereinafter claimed.

The invention claimed is:

1. A portable, cryogenic fluid pump apparatus with associated instrumentation, conduit legs and accessories in an optimal configuration on a modular supporting platform for plug and play installation at a filling station and on-site inspection and maintenance at the filling station, comprising:

the modular supporting platform comprising a first supporting structure, a second supporting structure and a third supporting structure to define a footprint of no greater than 16 ft2, said second and third supporting structures substantially perpendicular to the first supporting structure, and further wherein said second and said third supporting structures are situated substantially adjacent to each other;

the cryogenic fluid pump apparatus with associated instrumentation, conduit legs and accessories pre-assembled onto the modular supporting platform before deployment to the filling station, wherein the cryogenic fluid pump apparatus with associated instrumentation, conduit legs and accessories are positioned to create the optimal configuration onto the modular supporting platform;

said optimal configuration defined, at least in part, by (i) an unobstructed region to access the cryogenic fluid pump apparatus and associated instrumentation, conduit legs and accessories, said unobstructed region comprising a periphery extending along the modular supporting platform to facilitate the plug and play installation at the filling station and the on-site inspection and the maintenance at the filling station, and (ii) substantial horizontal alignment of one or more of the conduit legs with a corresponding downstream and/or upstream components of the filling station; the cryogenic fluid pump apparatus connected to the first supporting structure and the second supporting structure;

said conduit legs comprising a suction conduit, a return conduit and a discharge conduit each of which is connected to the cryogenic fluid pump apparatus;

said suction conduit extending from a suction port of the cryogenic fluid pump apparatus and adapted to receive cryogenic fluid from a source tank into the cryogenic fluid pump apparatus, said return conduit extending from a return port of the cryogenic fluid pump apparatus and adapted to return the cryogenic fluid from the cryogenic fluid pump apparatus to the source tank to enable recirculation of the cryogenic fluid from the source tank into the suction conduit, the return conduit followed by re-entry into the source tank, said recirculation occurring until a temperature of the return conduit is sufficiently reduced to prevent vaporization of the cryogenic fluid, said suction conduit and said return conduit extending outwards from the modular supporting platform into the unobstructed region and further wherein said suction conduit is configured to be in substantial horizontal alignment with a suction supply valve of the source tank; said discharge conduit extending from a discharge port of the cryogenic fluid pump apparatus along the unobstructed region and thereafter bent downwards so that a portion of the discharge conduit is situated at a lower elevation than each of the suction conduit and the return conduit, and further wherein said discharge conduit terminates as a branched conduit along the first supporting structure; said associated instrumentation and accessories comprising (i) supply instrumentation and accessories connected to the suction conduit, (ii) return instrumentation and accessories connected to the return conduit and (iii) discharge instrumentation and accessories connected to the discharge conduit; and a controller in electrical communication with one or more components in (i), (ii) or (iii) and the cryogenic fluid pump apparatus to regulate a flow of the cryogenic fluid along the suction conduit, the return conduit and the discharge conduit, said controller located within a control panel connected to the third supporting structure.

2. The portable, cryogenic fluid pump apparatus with associated instrumentation, conduit legs and accessories of claim 1, wherein said control panel with the controller therein is connected along an exterior region of the third supporting structure.

3. The portable, cryogenic fluid pump apparatus with associated instrumentation, conduit legs and accessories of claim 1, wherein each of the first supporting structure and the second supporting structure is a panel or plate-like structure.

4. The portable, cryogenic fluid pump apparatus with associated instrumentation, conduit legs and accessories of claim 1, wherein the first supporting structure is a bottom plate, said bottom plate comprising a first side, a second side, a third side and a fourth side, said first side adjacent to said second side to define at least a portion of the unobstructed region, the portion of the unobstructed region sufficiently sized to contain the suction conduit with the supply instrumentation and accessories, the return conduit with the return instrumentation and accessories and the discharge conduit with the discharge instrumentation and accessories.

5. The portable, cryogenic fluid pump apparatus with associated instrumentation, conduit legs and accessories of claim 1, wherein the second supporting structure is a panel, said panel oriented vertically and comprising an interior region within the panel that is sized to contain a crankshaft belt drive and a motor belt drive.

6. The portable, cryogenic fluid pump apparatus with associated instrumentation, conduit legs and accessories of claim 1, wherein the third supporting structure is a frame.

7. The portable, cryogenic fluid pump apparatus with associated instrumentation, conduit legs and accessories of claim 1, wherein the unobstructed region comprises the supply instrumentation and accessories, the return instrumentation and accessories and the discharge instrumentation and accessories along a first side and a second side of the first supporting structure.

8. The portable, cryogenic fluid pump apparatus with associated instrumentation, conduit legs and accessories of claim 1, wherein the discharge conduit is specifically configured to reduce pressure drop losses of the cryogenic fluid in a pressurized state that is conveyed downstream.

9. The portable, cryogenic fluid pump apparatus with associated instrumentation, conduit legs and accessories of claim 1, wherein the supply instrumentation and accessories comprise a first pressure relief valve connected to the suction conduit, and the return instrumentation and accessories comprise a second pressure relief valve connected to the return conduit.

10. The portable, cryogenic fluid pump apparatus with associated instrumentation, conduit legs and accessories of claim 1, further comprising a pulsation damper connected to the discharge conduit, said pulsation damper situated adjacent to the second supporting structure, wherein the second supporting structure is a panel, said panel oriented vertically and comprising an interior region sized to contain a crankshaft belt drive and a motor belt drive of the cryogenic fluid pump apparatus.

11. The portable, cryogenic fluid pump apparatus with associated instrumentation, conduit legs and accessories of claim 1, wherein the first supporting structure is a bottom plate comprising a first side, a second side, a third side and a fourth side, and wherein the cryogenic fluid pump apparatus comprises a sump pump connected to a crankshaft, said sump pump tilted downwards towards a first side of the first supporting structure.

12. The portable, cryogenic fluid pump apparatus with associated instrumentation, conduit legs and accessories of claim 11, wherein the supply instrumentation and accessories comprises a suction valve and a supply flexible hose as part of the suction conduit in substantial horizontal alignment with a corresponding supply valve of the source tank and wherein the return instrumentation and accessories comprises a return valve and a return flexible hose as part of the return conduit adapted to be connected with a corresponding return valve of the source tank.

13. The portable, cryogenic fluid pump apparatus with associated instrumentation, conduit legs and accessories of claim 1, wherein the return conduit comprises a thermocouple connected to the return conduit, said thermocouple measuring the temperature of the cryogenic fluid during the recirculation of the cryogenic fluid.

14. The portable, cryogenic fluid pump apparatus with associated instrumentation, conduit legs and accessories of claim 1, said second supporting structure being a vertically oriented panel having an interior region sized to receive a first belt drive for a crankshaft of the cryogenic fluid pump apparatus and a second belt drive for a motor of the cryogenic fluid pump apparatus, and wherein said crankshaft is connected to a hub ring of the first belt drive, said crankshaft tilted downwards towards an edge of the second supporting structure.

15. The portable, cryogenic fluid pump apparatus with associated instrumentation, conduit legs and accessories of claim 4, wherein said third side of the bottom plate contains the third supporting structure to access the control panel and said fourth side of the bottom plate comprises a portion of the unobstructed region to access the cryogenic fluid pump apparatus.

16. The portable, cryogenic fluid pump apparatus with associated instrumentation, conduit legs and accessories of claim 1, wherein the discharge instrumentation and accessories comprises a check valve, an isolation valve and a cold fill bypass valve.

17. The portable, cryogenic fluid pump apparatus with associated instrumentation, conduit legs and accessories of claim 1, wherein the branched conduit along the discharge conduit comprises a first connection adapted to be connected to a cold bypass valve, a second connection adapted to be connected to an inlet of a vaporizer and a third connection adapted to connect to an idle pump, wherein said branched conduit is located on the first supporting structure of the modular supporting platform along the periphery of the unobstructed region.

18. The portable, cryogenic fluid pump apparatus with associated instrumentation, conduit legs and accessories of claim 14, wherein the cryogenic fluid pump apparatus further includes a sump pump connected to a bottom portion of the crankshaft, said sump pump tilted downwards towards a first side of the first supporting structure, and further wherein the motor is connected to the first supporting structure, wherein said first supporting structure is a bottom plate.

19. The portable, cryogenic fluid pump apparatus with associated instrumentation, conduit legs and accessories of claim 1, wherein the discharge instrumentation and accessories further comprise a pulsation dampener connected to the discharge conduit.

20. The portable, cryogenic fluid pump apparatus with associated instrumentation, conduit legs and accessories of claim 19, wherein the discharge instrumentation and accessories further comprise an unload valve.

21. The portable, cryogenic fluid pump apparatus with associated instrumentation, conduit legs and accessories of claim 19, wherein the discharge instrumentation and accessories further comprise a pressure safety valve connected to a top portion of the pulsation dampener.

22. The portable, cryogenic fluid pump apparatus with associated instrumentation, conduit legs and accessories of claim 1, wherein the control panel comprises a pressure switch configured to shut off the cryogenic fluid pump apparatus when a maximum allowable pressure of downstream cylinders of the filling station is detected, said pressure switch in fluid communication with the discharge conduit.

23. The portable, cryogenic fluid pump apparatus with associated instrumentation, conduit legs and accessories of claim 1, further comprising a nitrogen purge conduit extending into the cryogenic fluid pump apparatus.

24. A portable, cryogenic fluid pump apparatus with associated instrumentation, conduit legs and accessories in an optimal configuration on a modular supporting platform for plug and play installation at a filling station and on-site inspection and maintenance at the filling station, comprising:

the modular supporting platform comprising a first supporting structure, a second supporting structure and a third supporting structure, said second and third supporting structures substantially perpendicular to the first supporting structure, and further wherein said second and said third supporting structures are situated substantially adjacent to each other;

the cryogenic fluid pump apparatus with associated instrumentation, conduit legs and accessories pre-assembled onto the modular supporting platform before deployment to the filling station, wherein the cryogenic fluid pump apparatus with associated instrumentation, conduit legs and accessories are positioned to create the optimal configuration onto the modular supporting platform;

said optimal configuration defined by a first unobstructed region to access the cryogenic fluid pump apparatus and a second unobstructed region to access associated instrumentation, conduit legs and accessories, said first unobstructed region non-overlapping with the second unobstructed region; the cryogenic fluid pump apparatus comprising multiple components that are connected to the first supporting structure and the second supporting structure within the first unobstructed region; said conduit legs comprising a suction conduit, a return conduit and a discharge conduit each of which is connected to the cryogenic fluid pump apparatus along the second unobstructed region; said suction conduit and said return conduit extending outwards from the modular supporting platform into the second unobstructed region and further wherein said suction conduit is configured to be in substantial horizontal alignment with a suction supply valve of the source tank; said discharge conduit extending from a discharge port of the cryogenic fluid pump apparatus along the second unobstructed region and extending along a periphery of the second unobstructed region until terminating as a branched conduit along the first supporting structure;

said associated instrumentation and accessories comprising (i) supply instrumentation and accessories connected to the suction conduit, (ii) return instrumentation and accessories connected to the return conduit and (iii) discharge instrumentation and accessories connected to the discharge conduit; and a controller in electrical communication with one or more components in (i), (ii) and/or (iii) and the pump apparatus to regulate a flow of cryogenic fluid along the suction conduit, the return conduit and the discharge conduit, said controller located within a control panel connected to the third supporting structure.

25. The portable, cryogenic fluid pump apparatus with associated instrumentation, conduit legs and accessories of claim 24, said discharge instrumentation and accessories comprising a pulsation dampener, a check valve, an unload valve, isolation manual valve, a branched conduit and a cold fill bypass valve.

26. The portable, cryogenic fluid pump apparatus with associated instrumentation, conduit legs and accessories and accessories of claim 24, comprising three direct connections to the modular support platform, wherein a first direct connection is between a motor of the cryogenic fluid pump apparatus and the first supporting structure, a second direct connection is between the cryogenic fluid pump apparatus and the second supporting structure and a third direct connection is between the control panel and the third supporting structure.

* * * * *